US012529259B1

(12) United States Patent
Block

(10) Patent No.: US 12,529,259 B1
(45) Date of Patent: Jan. 20, 2026

(54) FOLDABLE DOOR GUARD

(71) Applicant: Michael Block, Covington, IN (US)

(72) Inventor: Michael Block, Covington, IN (US)

( * ) Notice: Subject to any disclaimer, the term of this patent is extended or adjusted under 35 U.S.C. 154(b) by 0 days.

(21) Appl. No.: 18/917,292

(22) Filed: Oct. 16, 2024

(51) Int. Cl.
*E06B 7/28* (2006.01)
*E06B 1/34* (2006.01)
*E06B 3/88* (2006.01)

(52) U.S. Cl.
CPC .................. *E06B 7/28* (2013.01); *E06B 1/34* (2013.01); *E06B 3/88* (2013.01)

(58) Field of Classification Search
CPC ............... E06B 7/367; E06B 1/34; E06B 3/88
See application file for complete search history.

(56) References Cited

U.S. PATENT DOCUMENTS 1,090,562 A * 3/1914 Orr ..................... E05D 13/1215 16/80
4,344,253 A * 8/1982 Stiles ...................... E06B 7/367 16/250
4,928,430 A * 5/1990 George ..................... E06B 3/88 49/70
5,799,443 A * 9/1998 Koeniguer ................ E06B 3/88 16/404
5,867,941 A * 2/1999 Gurzenda ................. E06B 3/88 49/460
6,526,697 B1 * 3/2003 Borgardt ............... E06B 11/085 49/460
6,643,980 B1 * 11/2003 Dorder .................... E06B 7/367 49/460
6,931,789 B2 * 8/2005 Stout, Jr. ................. E06B 7/367 160/40
7,712,257 B2 * 5/2010 Johnson .................. E06B 7/367 49/383
7,841,573 B1 * 11/2010 Block ................. E05D 11/0054 52/211
8,091,299 B2 * 1/2012 Katz ..................... E04F 19/026 52/211
9,103,163 B2 * 8/2015 McCue ................. E01F 15/141
10,589,945 B2 * 3/2020 Martell .............. B65G 69/2876
11,168,509 B2 * 11/2021 Aust ....................... E04G 21/30
11,466,511 B1 * 10/2022 Chapman ................ E06B 7/367
11,473,368 B2 * 10/2022 Prodromou ............. E05D 9/005
2003/0205001 A1 * 11/2003 Williams ............ E05D 11/0054 49/383
2005/0155291 A1 * 7/2005 Homolka .................. E06B 7/28 49/462

FOREIGN PATENT DOCUMENTS

DE 102004015721 A1 * 10/2005 ............... E06B 7/28

* cited by examiner

*Primary Examiner* — Catherine A Kelly
(74) *Attorney, Agent, or Firm* — Schmeiser, Olsen & Watts LLP

(57) ABSTRACT

A foldable door guard is provided. The foldable door guard protects doors, such as swingable doors as well as door frames, and door hinges. The foldable door guard includes a plurality of pivotally interconnected planar members which are secured to the swingable door and the door frame. A pair of securing brackets are provided to secure the foldable door guard to a ground surface. The foldable door guard is positioned about the edge of the swingable door, the door frame and the door hinges.

20 Claims, 8 Drawing Sheets

FOLDABLE DOOR GUARD

BACKGROUND OF THE INVENTION

Technical Field

This invention relates generally to a door guard and more particularly to foldable door guard.

State of the Art

Doors, particularly swingable doors, are often damaged by pallet jacks, loading dollies, lift carts, hospital gurneys, and the like. When the door is in the open position, the edge of the door protrudes beyond the threshold of the door frame, leaving a large flat impact area resulting in significant damage to the door itself, the door hinges and/or the door frame.

As the open door protrudes from the door frame, the door frame protrudes from the wall resulting in another point of impact causing damage to the door frame directly as well as alignment issues preventing the door from operating properly. Doors generally need to be repaired and/or replaced when the door cannot close on its own, latch properly when closed, and/or operate properly due to a bent door frame, door hinge damage and/or door damage.

Accordingly, there is a need for a door guard to protect the door, door hinges and door frame of swingable doors.

SUMMARY OF THE INVENTION

The present invention relates to a foldable door guard to protect the door, door hinges and/or door frame of a swingable door.

An embodiment includes a foldable door guard comprising: a plurality of pivotally interconnected planar members comprising a first planar member and a second planar member, wherein the first planar member is provided with a longitudinally extending V-shaped portion extending along an outer edge portion thereof; a plurality of hinges, wherein the plurality of pivotally interconnected planar members are pivotably secured together via the plurality of hinges; and a longitudinally extending planar member secured to the first planar member, wherein the longitudinally extending planar member is provided with an outwardly extending longitudinal flange portion extending along an inner edge portion thereof, wherein the outwardly extending longitudinal flange portion is configured to be secured to a lower frame portion of a door frame of a swingable door; wherein the second planar member is pivotally secured to the first planar member, and wherein the second planar member is configured to be secured to a lower door portion of the swingable door.

Each of the plurality of hinges may be provided with a pivot pin received within a plurality of cylindrical openings provided along respective edge portions of each of the plurality of pivotally interconnected planar members. A planar extending portion may be provided on the first planar member of the plurality of pivotally interconnected planar members, wherein a first pair of longitudinally aligned apertures is provided within the planar extending portion. The longitudinally extending planar member may be provided with a second pair of longitudinally aligned apertures, and wherein a plurality of fasteners is provided between the first and second pairs of longitudinally aligned apertures to secure the longitudinally extending planar member with the planar extending portion of the first planar member.

A plurality of fasteners may be configured to secure the outwardly extending longitudinal flange portion of the longitudinally extending planar member to the lower frame portion of the door frame. A plurality of fasteners may be configured to secure the second planar member of the plurality of pivotally interconnected planar members to the lower door portion of the swingable door. The plurality of pivotally interconnected planar members may further comprise a third planar member and a fourth planar member, and wherein the third planar member and the fourth planar member may be located between the first and second planar members. The third and fourth planar members may be configured to respectively fold and unfold with the movement of the swingable door from a closed position to a partially open position and/or to a fully open position. A first and second securing bracket may be provided to secure the foldable door guard to a ground surface.

An embodiment includes a method of assembling a foldable door guard comprising: pivotably securing together a plurality of pivotally interconnected planar members, comprising a first planar member and a second planar member, via a plurality of hinges; providing the first planar member of the plurality of pivotally interconnected planar members with a longitudinally extending V-shaped portion extending along an outer edge portion thereof, securing a longitudinally extending planar member to the first planar member; providing the longitudinally extending planar member with an outwardly extending longitudinal flange portion extending along an inner edge portion thereof, securing the outwardly extending longitudinal flange portion to a lower frame portion of a door frame of a swingable door; pivotally securing the second planar member of the plurality of pivotally interconnected planar members to the first planar member; and securing the second planar member to a lower door portion of the swingable door.

The method may further comprise providing each of the plurality of hinges with a pivot pin received within a plurality of cylindrical openings provided along respective edge portions of each of the plurality of pivotally interconnected planar members. The method may further comprise providing a planar extending portion on the first planar member of the plurality of pivotally interconnected planar members, wherein a first pair of longitudinally aligned apertures is provided within the planar extending portion. The method may further comprise providing the longitudinally extending planar member with a second pair of longitudinally aligned apertures, wherein a plurality of fasteners is provided between the first and second pairs of longitudinally aligned apertures to secure the longitudinally extending planar member with the planar extending portion of the first planar member.

The method may further comprise providing a plurality of fasteners configured to secure the outwardly extending longitudinal flange portion of the longitudinally extending planar member to the lower frame portion of the door frame. The method may further comprise providing a plurality of fasteners configured to secure the second planar member of the plurality of pivotally interconnected planar members to the lower door portion of the swingable door. The plurality of pivotally interconnected planar members may further comprise a third planar member and a fourth planar member, and wherein the third planar member and the fourth planar member may be located between the first and second planar members. The third and fourth planar members may be configured to respectively fold and unfold with the movement of the swingable door from a closed position to a partially open position and/or to a fully open position. The method may further comprise providing a first and second securing bracket configured to secure the foldable door guard to a ground surface.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a foldable door guard. When a swingable door is in an open position, the foldable door guard of the present invention protects the edge of the swingable door as well as the door frame and the door hinges. The foldable door guard protects the swingable door, door frame and/or door hinges by deflecting door traffic, such as wheeled vehicles, movable equipment and/or personnel, in both directions.

The foldable door guard of the present invention surrounds the door frame of the swingable door, offering deflective protection to the door frame as well as the edge of the swingable door, by covering the gap between the door frame and the swingable door. The foldable door guard is expandable allowing protection in the fully open position of the swingable door. The foldable door guard allows the swingable door to operate unencumbered, while still protecting the door frame. The foldable door guard provides a dampening effect when impacted on the hinge mounted side of the swingable door and door frame when the swingable door is in the closed position.

The foldable door guard of the present invention protects the swingable door, door hinges and the door frame respectively, without losing clearance from the opening of the door frame; without impeding the function of the swingable door along with installed components, such as automatic openers, panic bars and/or kick plates; and without creating trip hazards and/or having protruding parts. The foldable door guard has a low profile and is easy to install. The foldable door guard is adaptable to any door opening in the range of from about 90 degrees to about 180 degrees.

Figure 1:
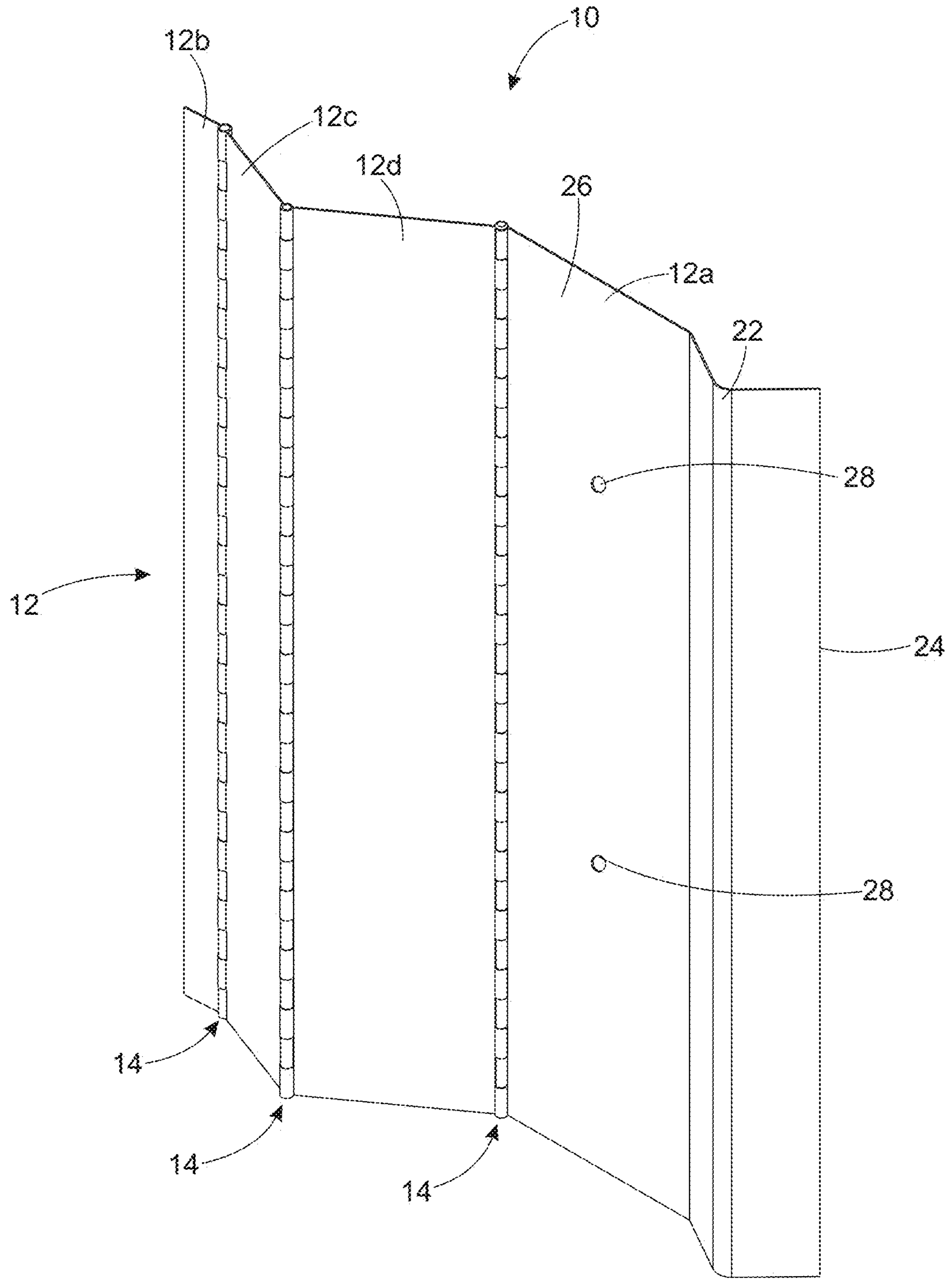
FIG. 1 is a perspective view of a foldable door guard according to an embodiment.
Figure 2:
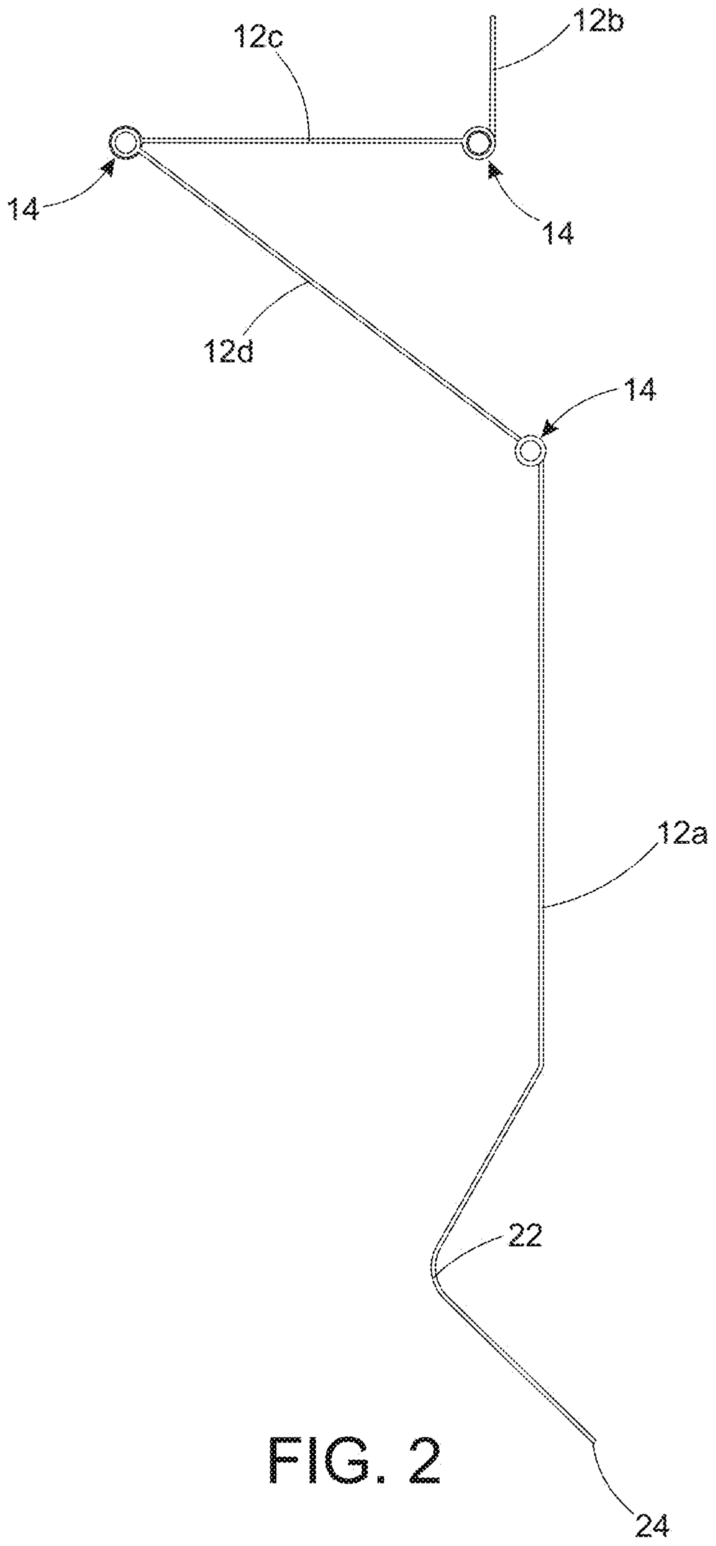
FIG. 2 is a planar top view of a foldable door guard according to an embodiment.
Figure 3:
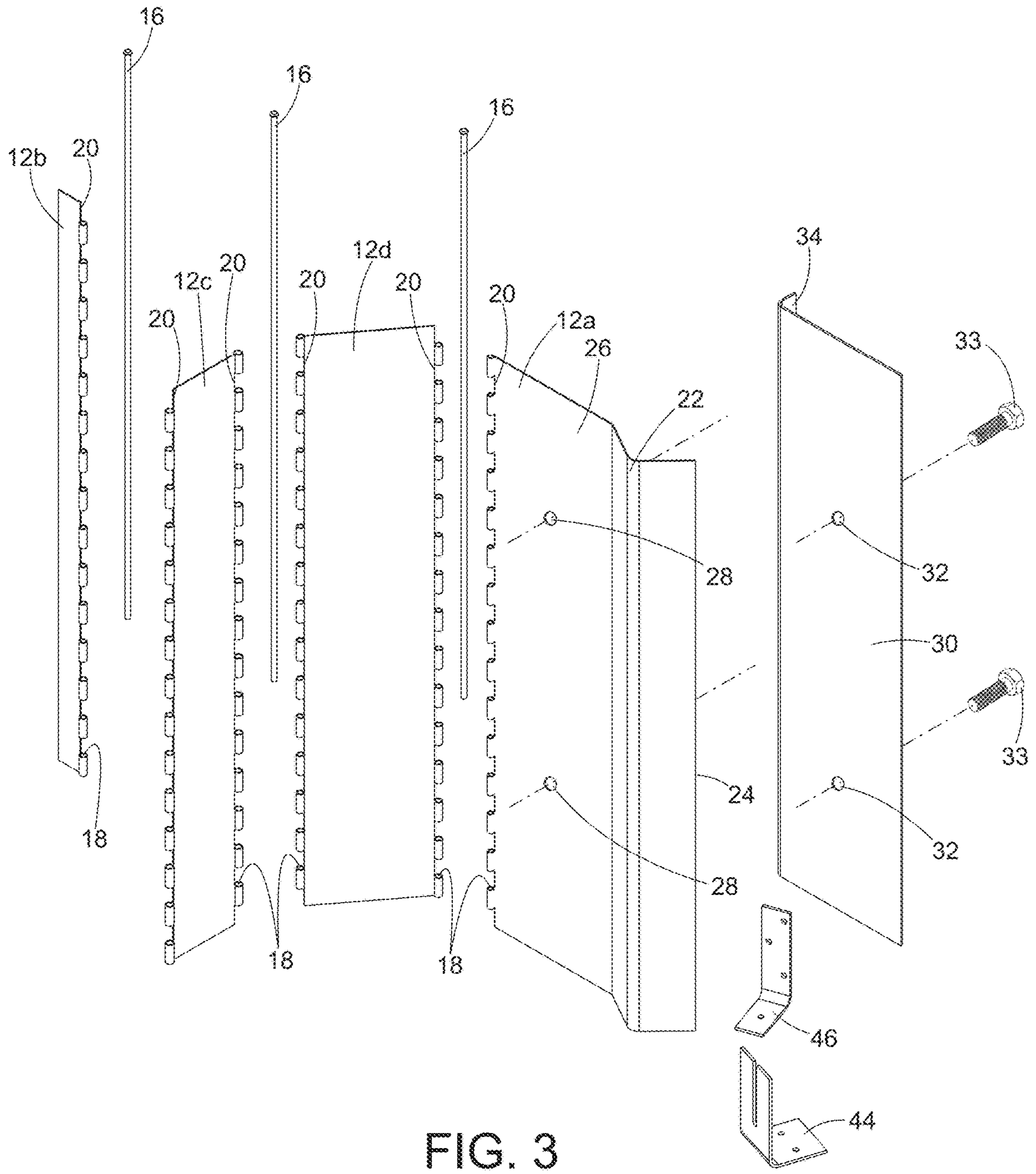
FIG. 3 is an exploded perspective view of a foldable door guard according to an embodiment.

Referring to FIGS. 1-3, a foldable door guard 10 is provided with a plurality of pivotally interconnected planar members 12. The plurality of pivotally interconnected planar members 12 are pivotably secured together via a plurality of hinges 14. Each of the plurality of hinges 14 is provided with a pivot pin 16 received within a plurality of cylindrical openings 18 provided along respective edge portions 20 of each of the plurality of pivotally interconnected planar members 12.

A first planar member 12*a* of the plurality of pivotally interconnected planar members 12 is provided with a longitudinally extending V-shaped portion 22 extending along an outer edge portion 24 thereof. A planar extending portion 26 is provided on the first planar member 12*a* of the plurality of pivotally interconnected planar members 12. A first pair of longitudinally aligned apertures 28 is provided within the planar extending portion 26. A longitudinally extending planar member 30 is provided with a second pair of longitudinally aligned apertures 32 and an outwardly extending longitudinal flange portion 34 extending along an inner edge portion 36 thereof.

Figure 4:
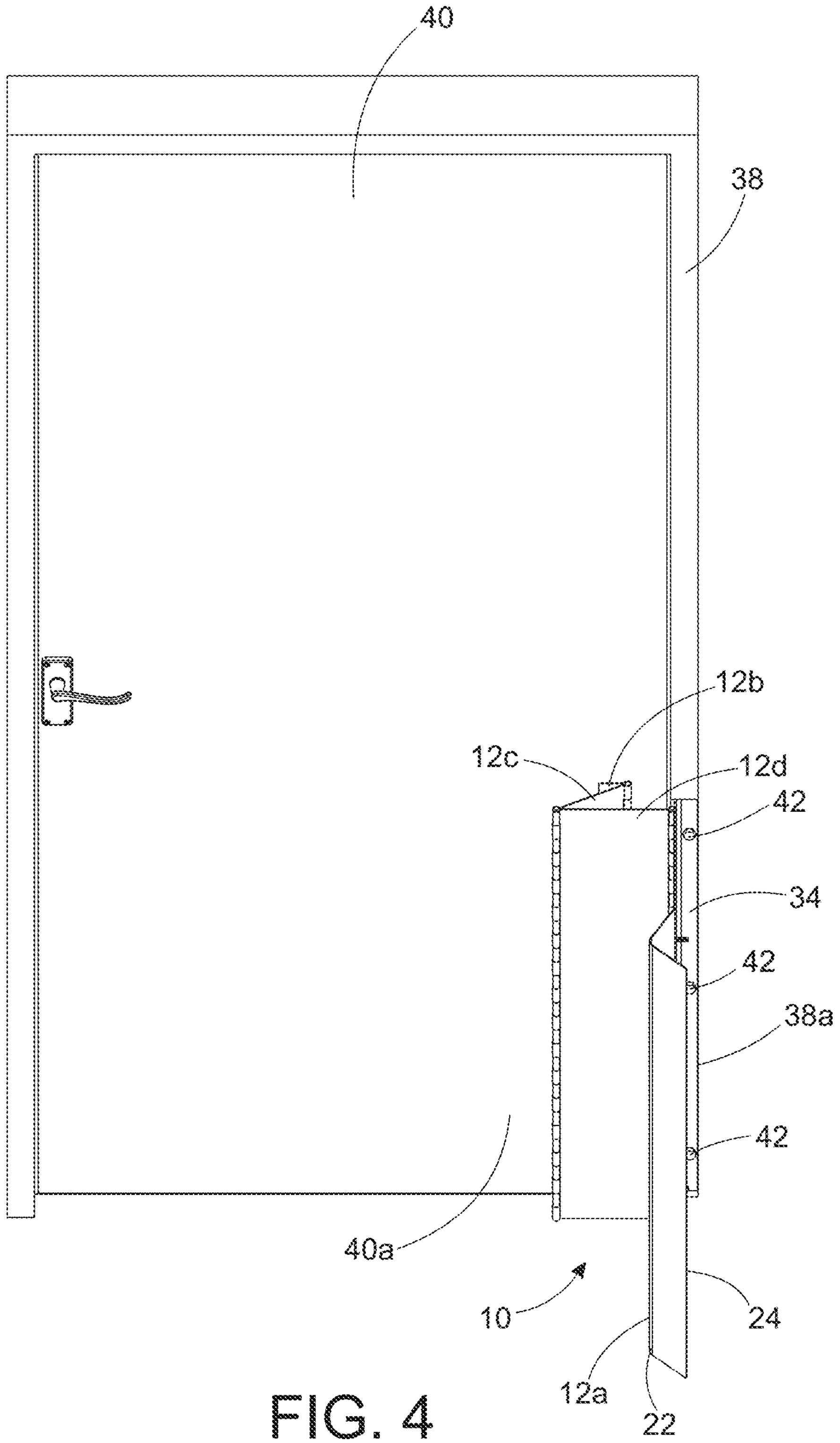
FIG. 4 is a perspective view of a foldable door guard installed on a swingable door and a door frame according to an embodiment.
Figure 5:
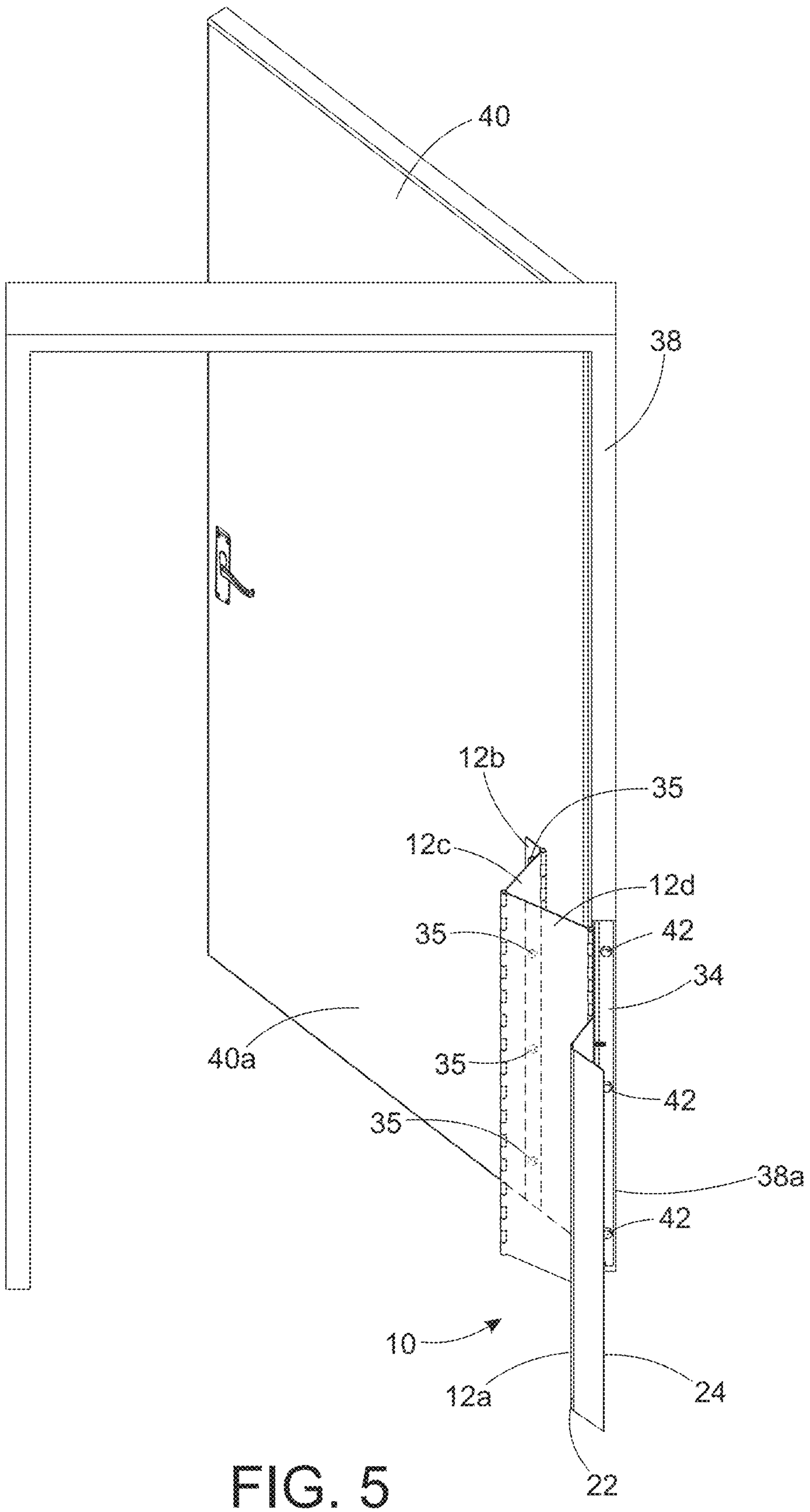
FIG. 5 is a perspective view of a foldable door guard installed on a swingable door and a door frame according to an embodiment.
Figure 6:
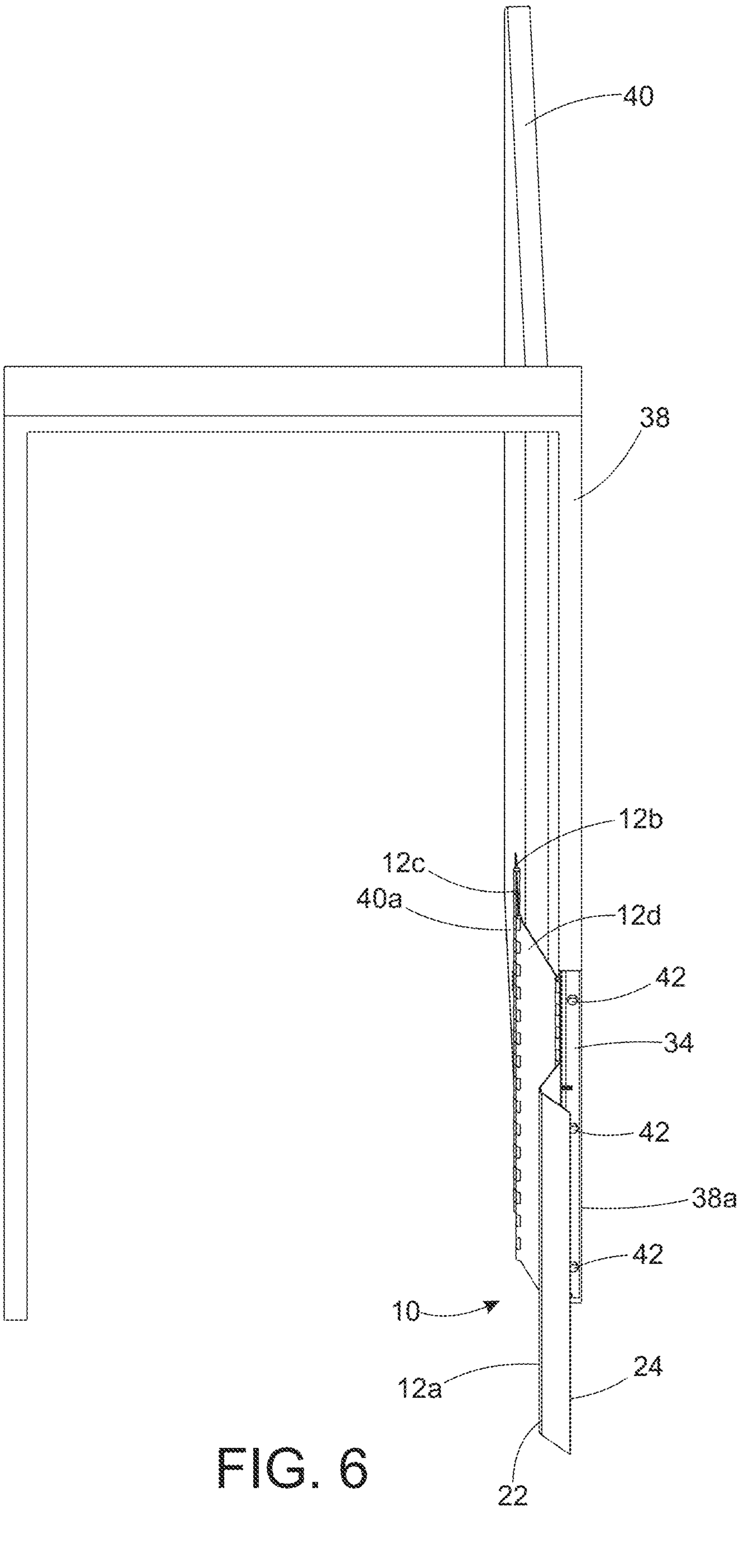
FIG. 6 is a perspective view of a foldable door guard installed on a swingable door and a door frame according to an embodiment.

Referring to FIGS. 4-6, the foldable door guard 10 is installed onto a lower frame portion 38*a* of a door frame 38 and a lower door portion 40*a* of a swingable door 40 in order to protect where the swingable door 40 is pivotably secured via a lower door hinge (not shown) to the door frame 38. The foldable door guard 10 is also provided with the longitudinally extending V-shaped portion 22 along the outer edge portion 24 in order to direct and/or divert any wheeled vehicles, movable equipment and/or personnel away from the lower door hinge (not shown) connecting the lower door portion 40*a* of the swingable door 40 to the lower frame portion 38*a* of the door frame 38. As shown in FIGS. 5 and 6, the foldable door guard 10 provides protection to the lower door portion 40*a* and the lower frame portion 38*a* when the swingable door 40 is either in a partially open position (see FIG. 5) or a fully open position (see FIG. 6).

As shown in FIGS. 4 and 5, the foldable door guard 10 is secured to the lower frame portion 38*a* of the door frame 38. The longitudinally extending planar member 30 is secured to the planar extending portion 26 of the first planar member 12*a* by providing a first plurality of fasteners 33 within the respective apertures 28, 32. The outwardly extending longitudinal flange portion 34 of the longitudinally extending planar member 30 is secured to the lower frame portion 38*a* via a second plurality of fasteners 42.

A second planar member 12*b* is secured to the lower door portion 40*a* via a third plurality of fasteners 35. The second planar member 12*b* is pivotally interconnected to the first planar member 12*a* via a third planar member 12*c* and a fourth planar member 12*d*. The third and fourth planar members 12*c*, 12*d* respectively fold and unfold with the movement of the swingable door 40 from a closed position (see FIG. 4) to a partially open position (see FIG. 5) and to a fully open position (see FIG. 6).

Figure 7:
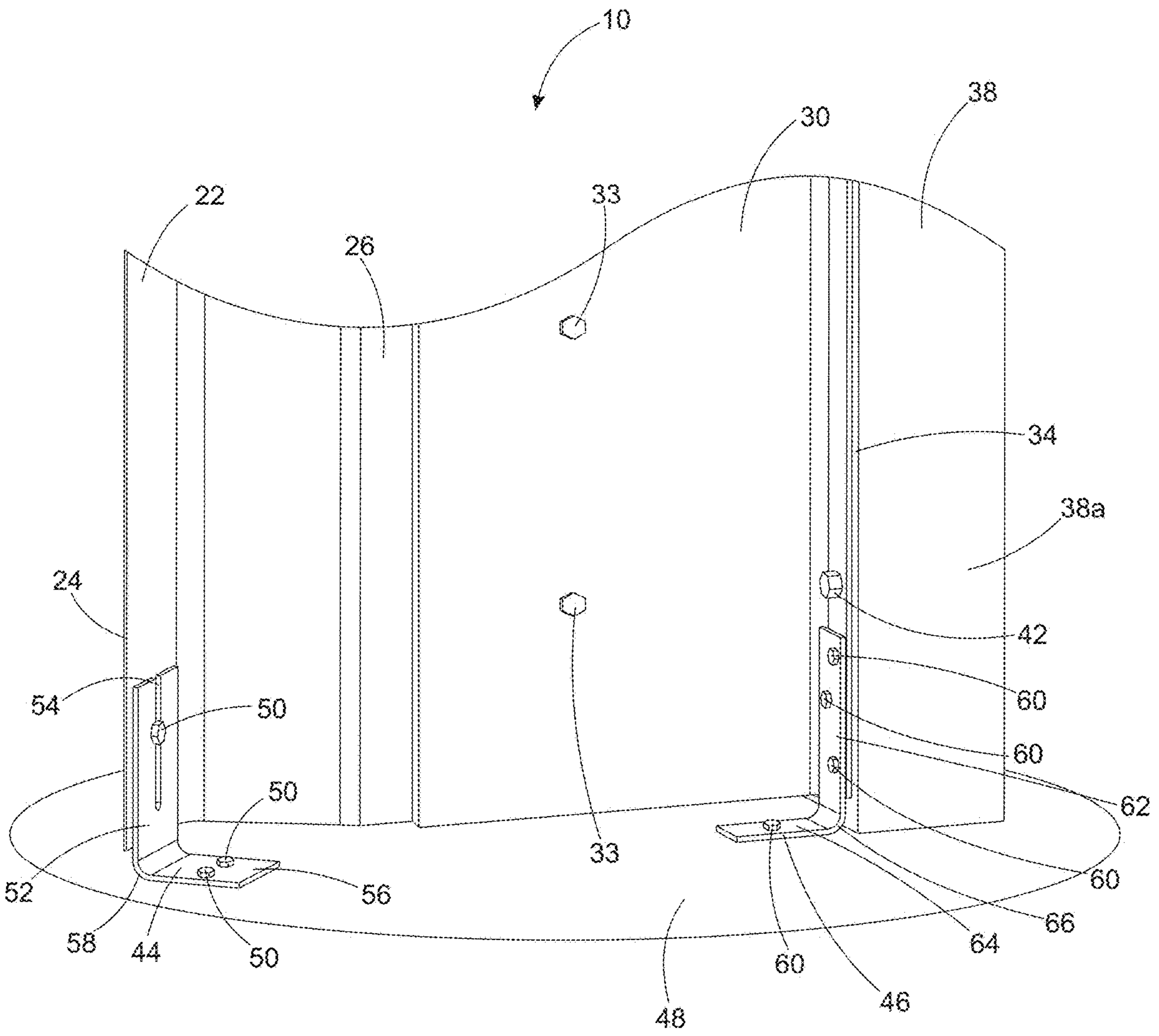
FIG. 7 is a perspective view of a foldable door guard installed on a swingable door and a door frame according to an embodiment.

As shown in FIGS. 3 and 7, once the foldable door guard 10 is installed on the door frame 38 and the swingable door 40, a first and second securing bracket 44, 46 is provided to secure the foldable door guard 10 to a ground surface 48. The first and second securing brackets 44, 46 distribute an impact force from wheeled vehicles, movable equipment and/or personnel to the ground surface 48. The first and second securing brackets 44, 46 may be L-shaped securing brackets.

As shown in FIG. 7, the first securing bracket 44 is provided to secure the longitudinally extending V-shaped portion 22 of the outer edge portion 24 to the ground surface 48 via a fourth plurality of fasteners 50. A first upstanding wall portion 52 is provided with a longitudinally extending slot 54 to accommodate at least one fastener of the fourth plurality of fasteners 50 in order to secure the first securing bracket 44 to the longitudinally extending V-shaped portion 22. A first laterally extending wall portion 56 extends from a first lower corner portion 58 of the first upstanding wall portion 52 in order to accommodate at least two fasteners of the fourth plurality of fasteners 50 to secure the first securing bracket 44 to the ground surface 48.

The second securing bracket 46 is provided to be secured to the outwardly extending longitudinal flange portion 34 securing the longitudinally extending planar member 30 to the lower frame portion 38*a* of the door frame 38. A fifth plurality of fasteners 60 is provided to respectively secure a second upstanding wall portion 62 to the outwardly extending longitudinal flange portion 34 and a second laterally extending wall portion 64 extending from a second lower corner portion 66 to the ground surface 48.

Figure 8:
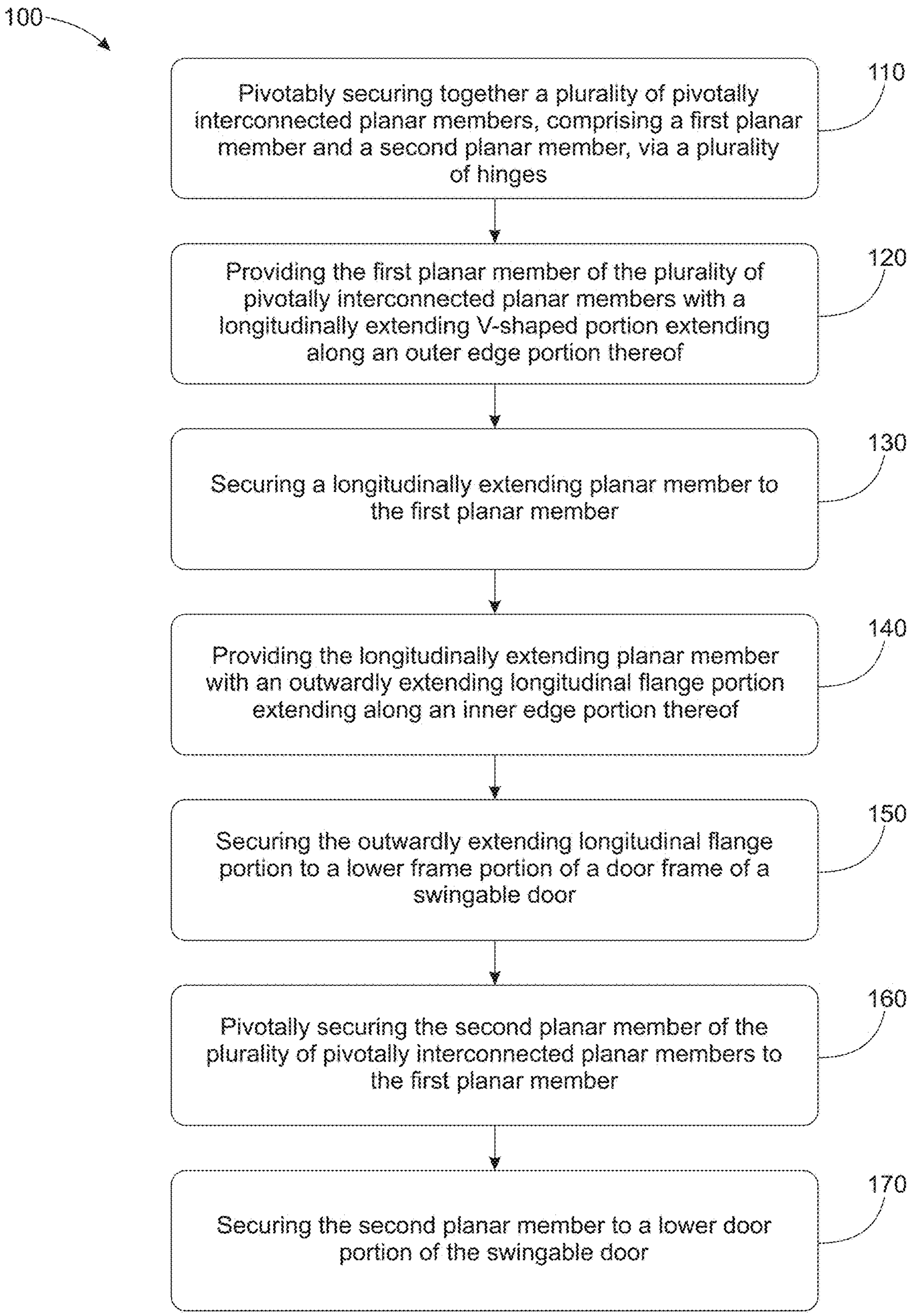
FIG. 8 is a block diagram of steps of a method of assembling a foldable door guard according to an embodiment.

FIG. 8 is a block diagram of steps of a method 100 of assembling a foldable door guard. Method 100 comprises: pivotably securing together a plurality of pivotally interconnected planar members, comprising a first planar member and a second planar member, via a plurality of hinges (Step 110); providing the first planar member of the plurality of pivotally interconnected planar members with a longitudinally extending V-shaped portion extending along an outer edge portion thereof (Step 120); securing a longitudinally extending planar member to the first planar member (Step 130); providing the longitudinally extending planar member with an outwardly extending longitudinal flange portion extending along an inner edge portion thereof (Step 140); securing the outwardly extending longitudinal flange portion to a lower frame portion of a door frame of a swingable door (Step 150); pivotally securing the second planar member of the plurality of pivotally interconnected planar members to the first planar member (Step 160); and securing the second planar member to a lower door portion of the swingable door (Step 170).

The method may further comprise providing each of the plurality of hinges with a pivot pin received within a plurality of cylindrical openings provided along respective edge portions of each of the plurality of pivotally interconnected planar members. The method may further comprise providing a planar extending portion on the first planar member of the plurality of pivotally interconnected planar members, wherein a first pair of longitudinally aligned apertures is provided within the planar extending portion. The method may further comprise providing the longitudinally extending planar member with a second pair of longitudinally aligned apertures, wherein a plurality of fasteners is provided between the first and second pairs of longitudinally aligned apertures to secure the longitudinally extending planar member with the planar extending portion of the first planar member.

The method may further comprise providing a plurality of fasteners configured to secure the outwardly extending longitudinal flange portion of the longitudinally extending planar member to the lower frame portion of the door frame. The method may further comprise providing a plurality of fasteners configured to secure the second planar member of the plurality of pivotally interconnected planar members to the lower door portion of the swingable door. The plurality of pivotally interconnected planar members may further comprise a third planar member and a fourth planar member, and wherein the third planar member and the fourth planar member may be located between the first and second planar members. The third and fourth planar members may be configured to respectively fold and unfold with the movement of the swingable door from a closed position to a partially open position and/or to a fully open position. The method may further comprise providing a first and second securing bracket configured to secure the foldable door guard to a ground surface.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A foldable door guard comprising:

at least two pivotally interconnected planar members comprising a first planar member and a second planar member, wherein the first planar member is provided with a longitudinally extending V-shaped portion extending along an outer edge portion thereof and a planar extending portion extending from the longitudinally extending V-shaped portion of the first planar member;

at least one hinge, wherein the at least two pivotally interconnected planar members are pivotably secured together via the at least one hinge; and a longitudinally extending planar member having a planar portion fixedly secured and extending along the planar extending portion of the first planar member, wherein the longitudinally extending planar member is provided with an outwardly extending longitudinal flange portion extending along an inner edge portion of the planar portion of the longitudinally extending planar member, wherein the outwardly extending longitudinal flange portion is configured to be secured to a lower frame portion of a door frame of a swingable door; wherein the second planar member is pivotally secured to the first planar member, and wherein the second planar member is configured to be secured to a lower door portion of the swingable door.

2. The foldable door guard of claim 1, wherein the at least one hinge is provided with a pivot pin received within a plurality of cylindrical openings provided along respective edge portions of each of the at least two pivotally interconnected planar members.

3. The foldable door guard of claim 1, wherein a first pair of longitudinally aligned apertures is provided within the planar extending portion of the first planar member.

4. The foldable door guard of claim 3, wherein the longitudinally extending planar member is provided with a second pair of longitudinally aligned apertures within the planar portion of the longitudinally extending planar member, and wherein a plurality of fasteners is provided between the first and second pairs of longitudinally aligned apertures to secure the planar portion of the longitudinally extending planar member with the planar extending portion of the first planar member.

5. The foldable door guard of claim 1, wherein a plurality of fasteners is configured to secure the outwardly extending longitudinal flange portion of the longitudinally extending planar member to the lower frame portion of the door frame.

6. The foldable door guard of claim 1, wherein a plurality of fasteners is configured to secure the second planar member of the at least two pivotally interconnected planar members to the lower door portion of the swingable door.

7. The foldable door guard of claim 1, wherein the at least two pivotally interconnected planar members further comprises a third planar member and a fourth planar member, and wherein the third planar member and the fourth planar member are located between the first and second planar members.

8. The foldable door guard of claim 7, wherein the third and fourth planar members are configured to respectively fold and unfold with the movement of the swingable door from a closed position to a partially open position and/or to a fully open position.

9. The foldable door guard of claim 1, wherein a first securing bracket is provided between the first planar member and a ground surface to secure the foldable door guard to the ground surface, and wherein a second securing bracket is provided between the outwardly extending longitudinal flange portion and the ground surface.

10. The foldable door guard of claim 9, wherein the first and second securing brackets are respectively provided with an upstanding wall portion and a laterally extending wall portion to receive at least one fastener respectively therein.

11. A method of assembling a foldable door guard, the method comprising:

pivotably securing together at least two pivotally interconnected planar members, comprising a first planar member and a second planar member, via e at least one hinge;

providing the first planar member of the at least two pivotally interconnected planar members with a longitudinally extending V-shaped portion extending along an outer edge portion thereof and a planar extending portion extending from the longitudinally extending V-shaped portion of the first planar member;

fixedly securing a longitudinally extending planar member having a planar portion to extend along the planar extending portion of the first planar member, providing the longitudinally extending planar member with an outwardly extending longitudinal flange portion extending along an inner edge portion of the planar portion of the longitudinally extending planar member;

securing the outwardly extending longitudinal flange portion to a lower frame portion of a door frame of a swingable door;

pivotally securing the second planar member of the at least two pivotally interconnected planar members to the first planar member; and securing the second planar member to a lower door portion of the swingable door.

12. The method of claim 11, further comprising providing the at least one hinge with a pivot pin received within a plurality of cylindrical openings provided along respective edge portions of each of the at least two pivotally interconnected planar members.

13. The method of claim 11, further comprising providing a first pair of longitudinally aligned apertures within the planar extending portion of the first planar member.

14. The method of claim 13, further comprising providing the longitudinally extending planar member with a second pair of longitudinally aligned apertures within the planar portion of the longitudinally extending planar member, wherein a plurality of fasteners is provided between the first and second pairs of longitudinally aligned apertures to secure the planar portion of the longitudinally extending planar member with the planar extending portion of the first planar member.

15. The method of claim 11, further comprising providing a plurality of fasteners configured to secure the outwardly extending longitudinal flange portion of the longitudinally extending planar member to the lower frame portion of the door frame.

16. The method of claim 11, further comprising providing a plurality of fasteners configured to secure the second planar member of the at least two pivotally interconnected planar members to the lower door portion of the swingable door.

17. The method of claim 11, wherein the at least two pivotally interconnected planar members further comprises a third planar member and a fourth planar member, and wherein the third planar member and the fourth planar member are located between the first and second planar members.

18. The method of claim 17, wherein the third and fourth planar members are configured to respectively fold and unfold with the movement of the swingable door from a closed position to a partially open position and/or to a fully open position.

19. The method of claim 11, further comprising providing a first securing bracket between the first planar member and a ground surface configured to secure the foldable door guard to the ground surface, and wherein a second securing bracket is provided between the outwardly extending longitudinal flange portion and the ground surface.

20. The method of claim 19, further comprising providing the first and second securing brackets respectively with an upstanding wall portion and a laterally extending wall portion to receive at least one fastener respectively therein.

* * * * *